United States Patent
Godsey et al.

[11] Patent Number: 5,984,196
[45] Date of Patent: Nov. 16, 1999

[54] THERMAL ROTARY VENT

[76] Inventors: Edward L. Godsey, 4209 SW. Stone, Topeka, Kans. 66610; James Franks, 219 Osage St., Burlingame, Kans. 66413

[21] Appl. No.: 08/933,213

[22] Filed: Sep. 18, 1997

[51] Int. Cl.⁶ .................................................. G05D 23/08
[52] U.S. Cl. ........................ 236/49.5; 454/258; 454/335
[58] Field of Search ........................... 236/49.5; 137/601; 454/258, 278, 320, 325, 335

[56] References Cited

U.S. PATENT DOCUMENTS

| | | | |
|---|---|---|---|
| 2,187,767 | 1/1940 | Akers | 236/49.5 |
| 3,436,016 | 4/1969 | Edwards | 236/49.5 |
| 3,528,606 | 9/1970 | Witten | 236/49.5 |
| 3,715,967 | 2/1973 | Field . | |
| 3,732,800 | 5/1973 | Goettel . | |
| 3,996,952 | 12/1976 | Root | 137/601 |
| 4,175,480 | 11/1979 | Beam, Jr. et al. | 236/49.5 |
| 4,208,010 | 6/1980 | Beam, Jr. et al. . | |
| 4,231,514 | 11/1980 | McSwain . | |
| 4,243,175 | 1/1981 | McSwain | 236/49.5 |
| 4,251,024 | 2/1981 | Feinberg | 236/1 G |
| 4,290,554 | 9/1981 | Hensley | 236/49.5 |
| 4,328,927 | 5/1982 | McSwain | 236/49.5 |
| 4,493,456 | 1/1985 | Sarazen, Jr. et al. . | |
| 4,497,362 | 2/1985 | Teague, Jr. | 165/54 |
| 4,699,045 | 10/1987 | Hensley | 236/49.5 |
| 4,738,191 | 4/1988 | Porter . | |
| 4,829,882 | 5/1989 | Jackson | 236/49.1 |
| 4,915,023 | 4/1990 | Porter | 403/401 |
| 4,962,882 | 10/1990 | Sarazen, Jr. et al. | 236/49.5 |
| 5,158,260 | 10/1992 | LeBlanc et al. | 251/63.4 |
| 5,441,451 | 8/1995 | Jeung | 454/313 |
| 5,449,143 | 9/1995 | Hur | 251/77 |
| 5,575,703 | 11/1996 | Stearns | 449/13 |

FOREIGN PATENT DOCUMENTS 4424904 1/1995 Germany .

*Primary Examiner*—William E. Tapoicai
*Attorney, Agent, or Firm*—Chase & Yakimo, L.C.

[57] ABSTRACT

An air vent that automatically opens and closes in response to changes in the ambient air temperature. The air vent includes a housing, a louver frame mounted to the housing and a series of vent louvers pivotally mounted to the frame. The louver frame includes a cam member for automatically pivoting the louvers between an open position and a closed position in response to ambient air temperature changes. The cam member includes a spring fixedly mounted at one end to the housing and mounted at the other end to a camming bar, which is mounted to the louvers. This spring is formed of two different types of metals which react to changes in the ambient air temperature. More specifically, the metals are chosen so that the spring expands as the temperature increases to rotate the cam bar in one direction and incrementally open the louvers, and contracts as the temperature decreases to rotate the cam bar in the reverse direction and incrementally close the louvers. The camming bar is mounted to end bars which are pivotally attached along opposing ends of the louvers.

5 Claims, 11 Drawing Sheets

THERMAL ROTARY VENT

FIELD OF THE INVENTION

This invention relates to an air vent having louver blades that are automatically opened and closed by a thermally activated spring. More specifically, the vent opens and closes the louvers in response to changes in the ambient air temperature.

BACKGROUND OF THE INVENTION

Power exhausters or vents are typically mounted to building roofs either vertically or in line with the slope of the roof. These exhausts and vents are usually in a normally closed position and do not open until a powered exhaust fan is activated or hot air increases the atmospheric pressure to the point that the dampers or louvers open. Upon a drop in the pressure torsional springs urge the open louvers to a closed position. Such devices require expensive motors and/or fans and normally move the louvers only between discrete closed end fully opened positions.

SUMMARY OF THE INVENTION

Accordingly, a primary object of the subject invention is to provide an air vent having louvers that are automatically and incrementally adjusted between an open position and a closed position in response to ambient air temperature changes.

Another object of the subject invention is to provide an air vent in which the louvers are automatically adjusted by a spring formed of a combination of metals so as to contract and expand in response to changes in the ambient air temperature in a manner to open and close the louvers.

Still another object of the subject invention is to provide an air vent which incrementally closes and opens in response to temperature changes but is not restricted to specific temperature ranges and can be applied to various climates.

Yet another object of the subject invention is to provide an air vent for use with a variety of venting systems and configurations, for instance in residential and commercial buildings.

Another object of the subject invention is to provide an automatically activated air vent which does not require the use of expensive motors or exhaust fans.

Still another object of the subject invention is to provide an air vent having a spring which prevents the build-up of hot air within an enclosed area.

Yet another object of the subject invention is to provide an air vent that is relatively simple, efficient and cost effective to manufacture and install at a variety of roof and gable type structural openings for the commercial or residential building industry.

These objects are attained by providing an air vent, comprising a housing, a louver frame mounted to the housing and a plurality of vent louvers adjustably mounted within the frame. The louver frame includes a cam member for automatically incrementally adjusting the louvers between an open position and a closed position in response to ambient air temperature changes. The cam member includes a spring fixedly mounted at one end to the housing and mounted at the other end to a camming bar, which is mounted to the louvers. This spring is formed of two different types of metals which react to changes in the ambient air temperature. More specifically, the metals are chosen so that the spring expands as the temperature increases to rotate the cam bar in one direction and incrementally open the louvers, and contracts as the temperature decreases to rotate the cam bar in an opposed direction and incrementally close the louvers. The camming bar is mounted to side bars which are pivotally attached to opposed ends of the louvers.

Other objects and advantages of this invention will become apparent from the following description taken in connection with the accompanying drawings, wherein is set forth by way of illustration and example, an embodiment of this invention.

DETAILED DESCRIPTION OF PREFERRED EMBODIMENT

Figure 1:
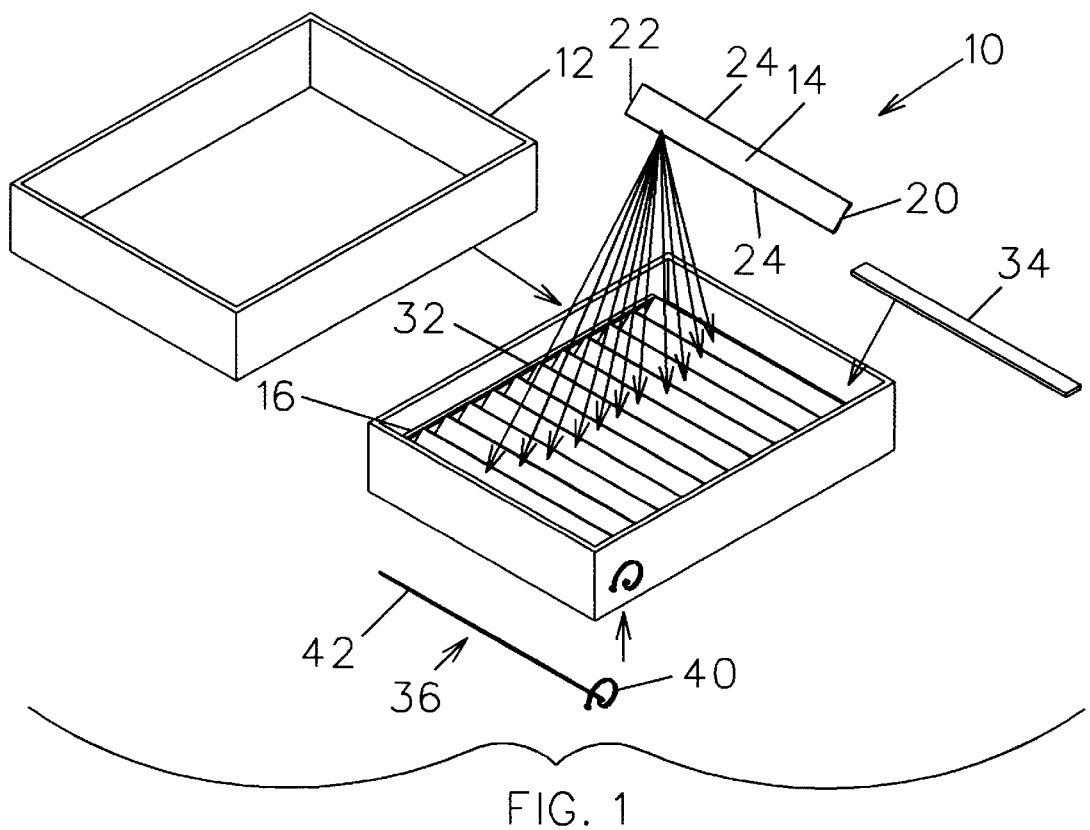
FIG. 1 is an exploded view of an air vent in accordance with the present invention.
Figure 2:
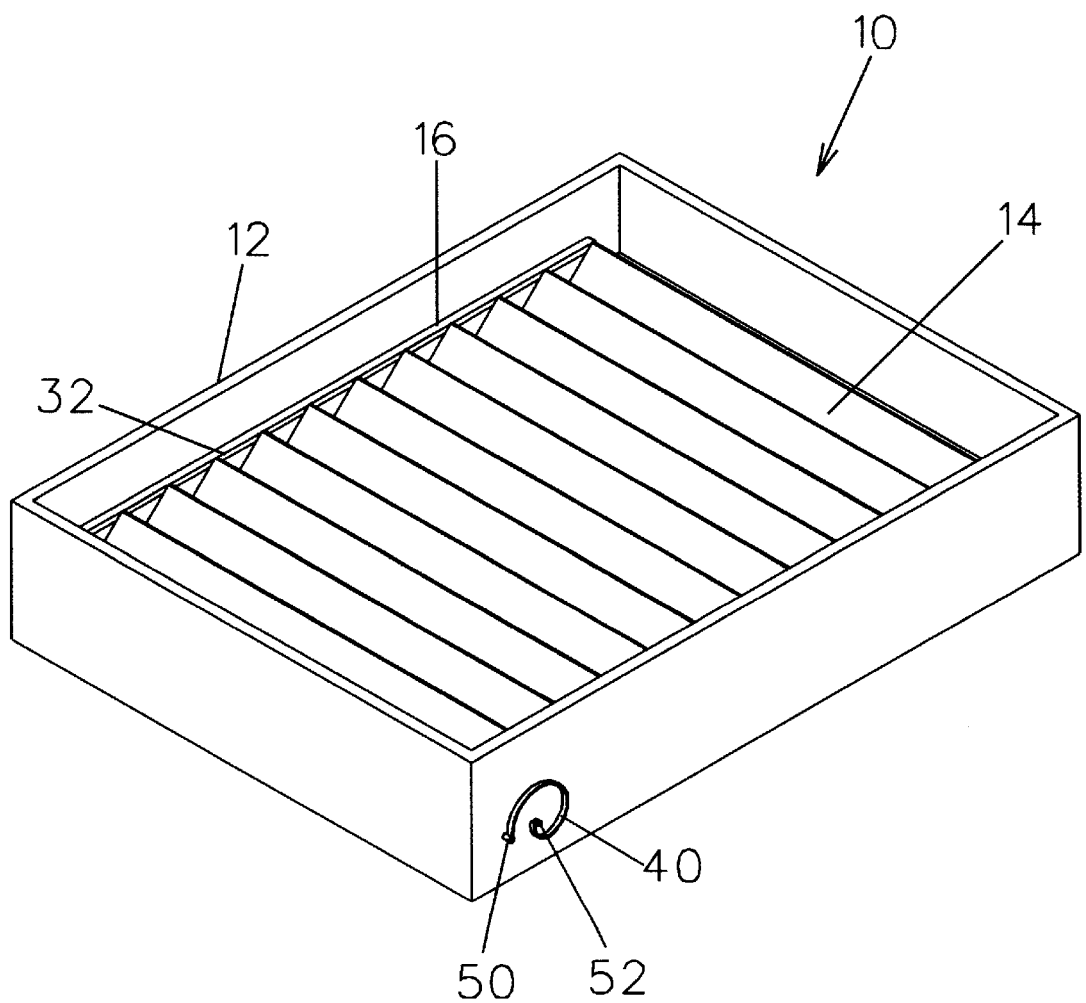
FIG. 2 is a perspective view of an air vent in accordance with the present invention with the louvers in an open position.
Figure 3:
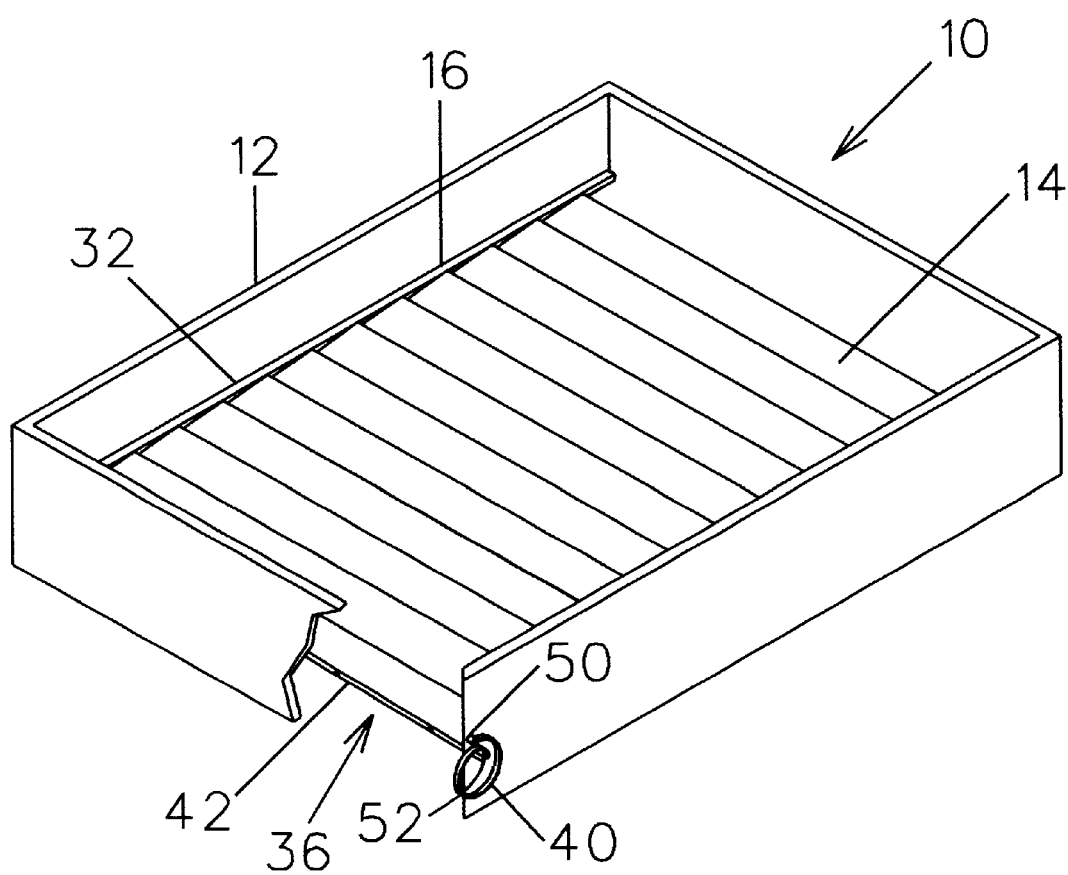
FIG. 3 is a perspective view of the air vent of FIG. 2 but with the louvers in their closed position and the housing and frame partially cut away to show the camming member.
Figure 4:
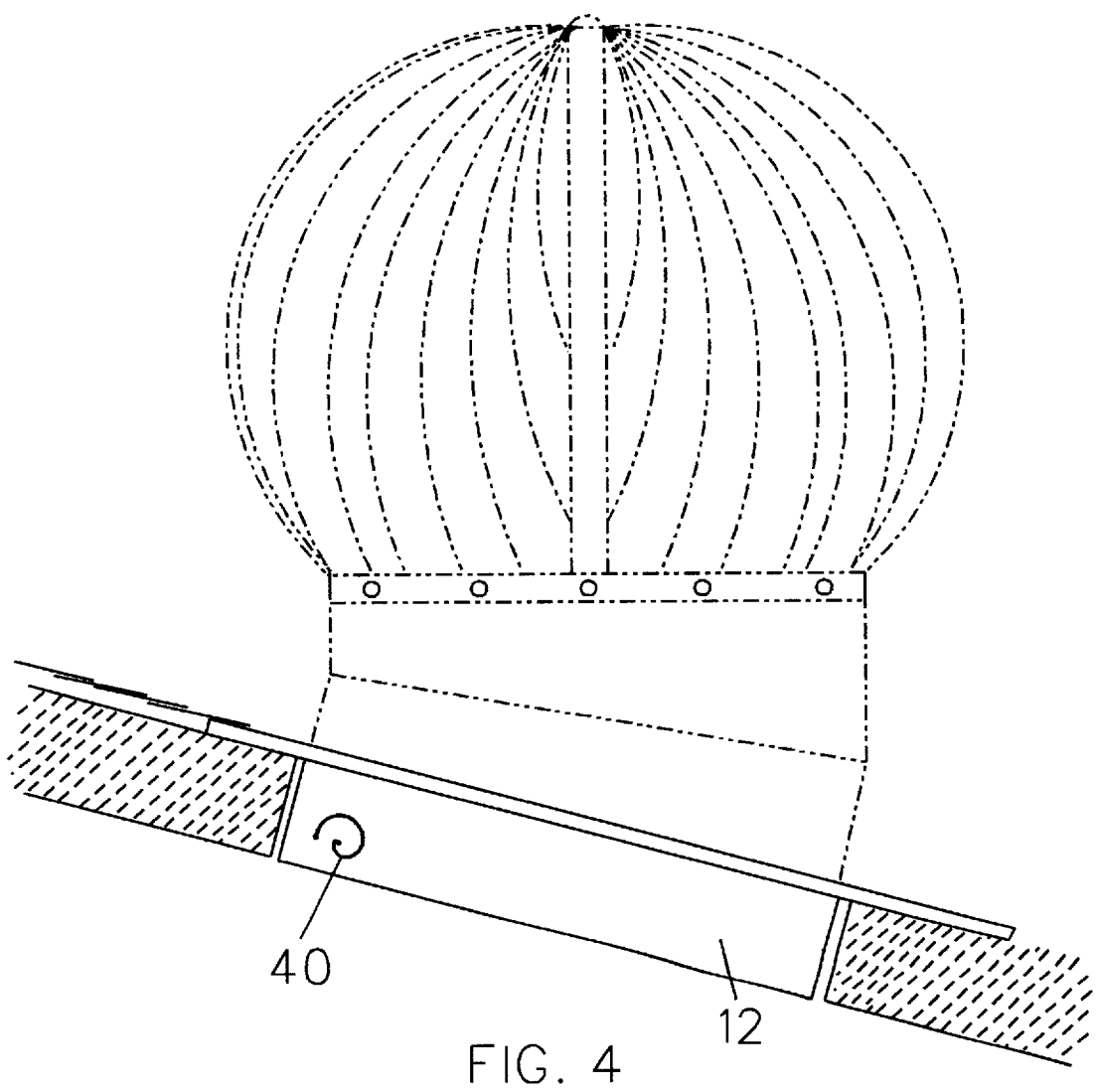
FIG. 4 is a side elevational view showing a turbine air vent installed on a roof top.

Air vent 10, as in FIGS. 1–3, responds to increases and decreases in ambient air temperature to open and close vent 10. See FIGS. 2 and 3. Vent 10 includes housing 12 in which a series of louvers 14 and frame 16 are mounted. Housing 12 is fixedly and securably mounted within roof, ceiling or wall around the vent opening therein. See FIG. 4. Frame 16 causes louvers 14 to pivot incrementally between an open and closed position as the ambient air temperature changes.

Each louver 14 includes ends 20 and 22 which are pivotally mounted to frame 16. Louvers 14 are mounted adjacent one another to form a series thereof. Louvers 14 pivot incrementally between closed positions and open positions. At the closed position, louvers 14 are substantially horizontal, and at the full open position, louvers 14 are substantially vertical (assuming vent 10 is mounted horizontally). Thus, louvers 14 may pivot up to 90° between the full open and full closed positions.

Figure 7:
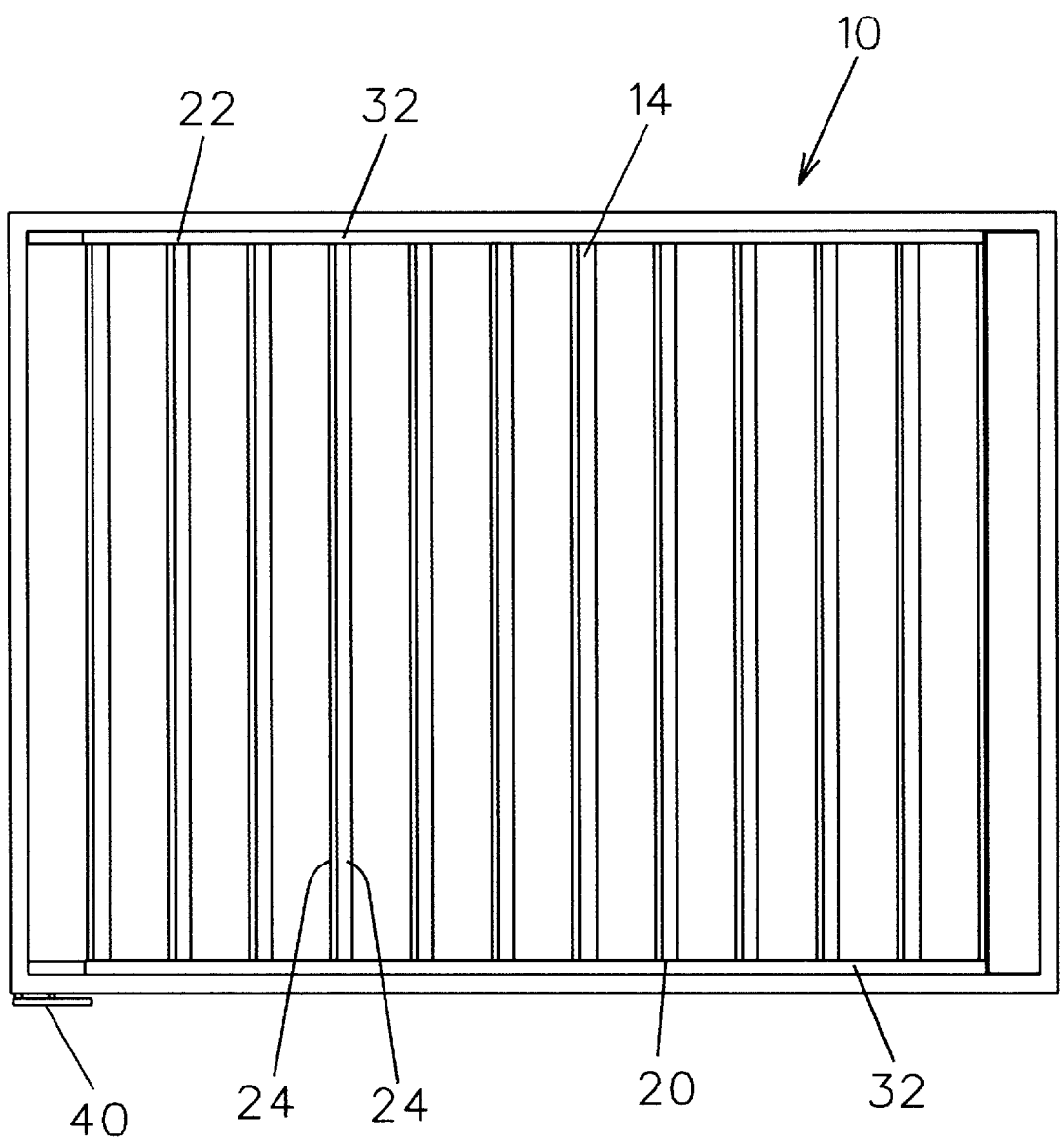
FIG. 7 is a top plan view of the air vent of FIG. 2.
Figure 8:
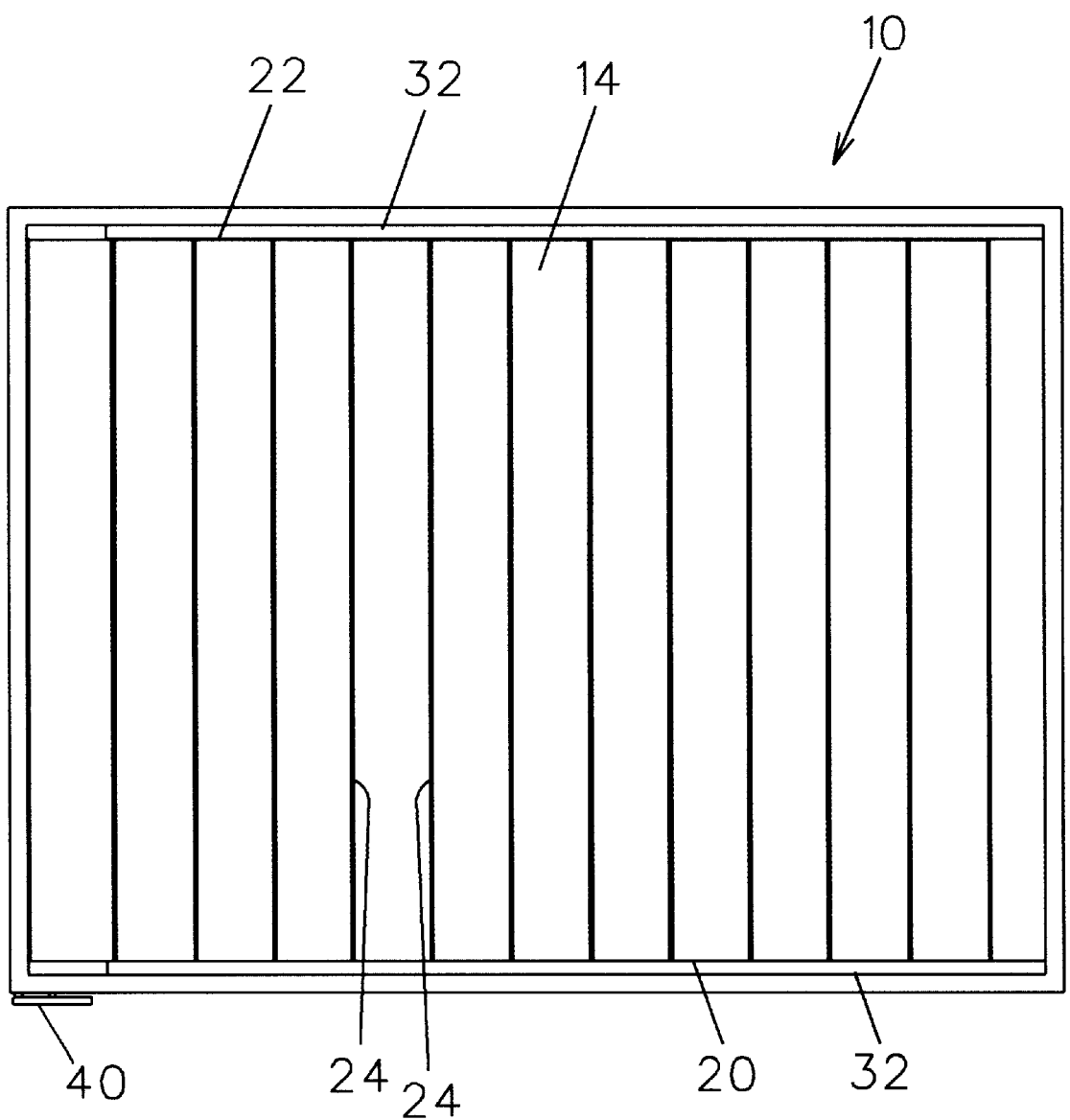
FIG. 8 is a top plan view of the air vent of FIG. 3.

When louvers 14 are in an open position, they are spaced apart and allow ventilation or air to pass therethrough. See FIGS. 2 and 7. The amount of ventilation increases as Louvers 14 pivot to the full open position.

When in the closed position, as in FIG. 3, each side 24 is immediately adjacent a side 24 of the next adjacent louver 14, with the exception of the first and last louver 14, of which one side 24 engages the frame 16. In the closed position, louvers 14 substantially prevent any ventilation or air to pass through vent 10.

Figure 9:
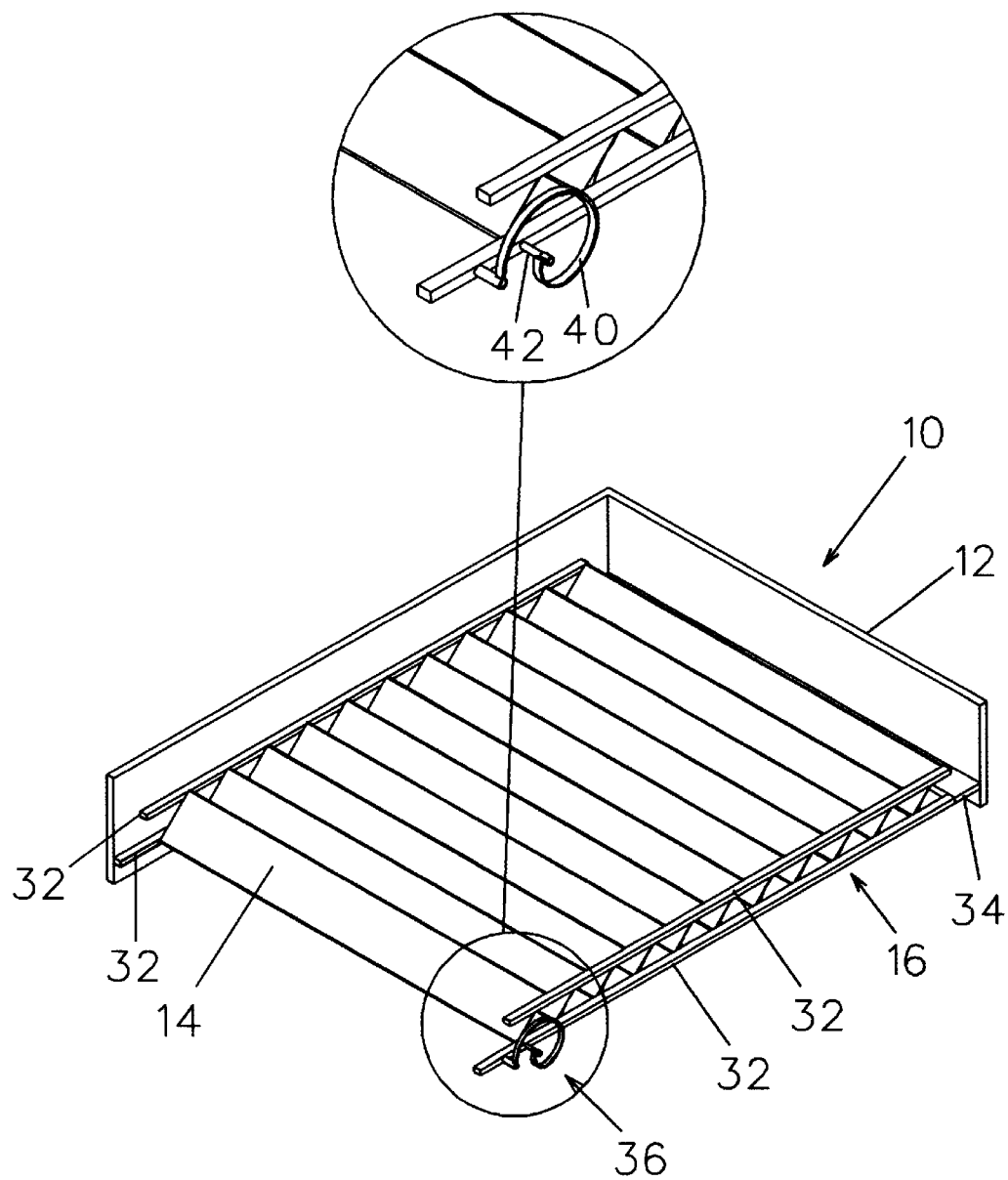
FIG. 9 is a perspective view of the air vent with the housing broken away to show the frame and cam member on an enlarged scale.
Figure 10:
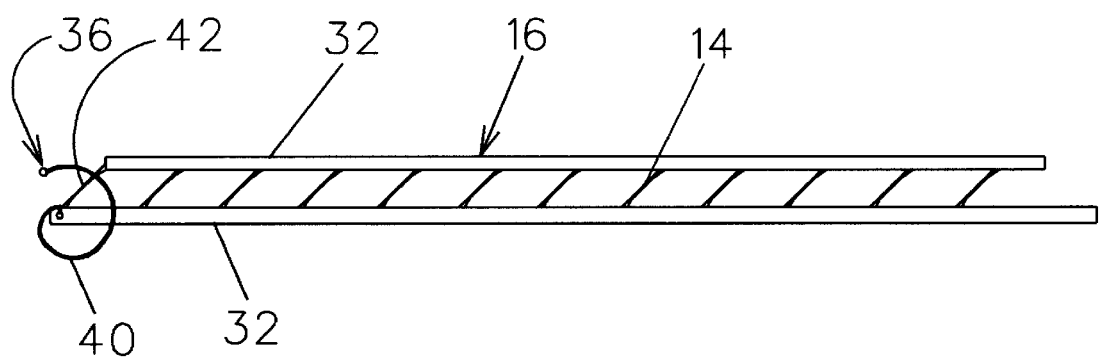
FIG. 10 is a side diagrammatic view of the louvers mounted within the frame and in an open position.

Frame 16 includes two pairs of end bars 32 at opposed ends 20 and 22 of louvers 14, louver rest 34 and cam member 36. See FIGS. 1 and 9. The lower end bars 32 are fixed to the housing with the upper end bars 32 slidably mounted within housing 12 and are pivotally connected along the opposed ends 20 and 22 of louvers 14, as in FIGS. 7–11. Each individual louver 14 is thus attached in series to the other louvers 14 by end bars 32 such that each louver 14 pivots or rotates at its connection to each end bar 32.

Figure 5:
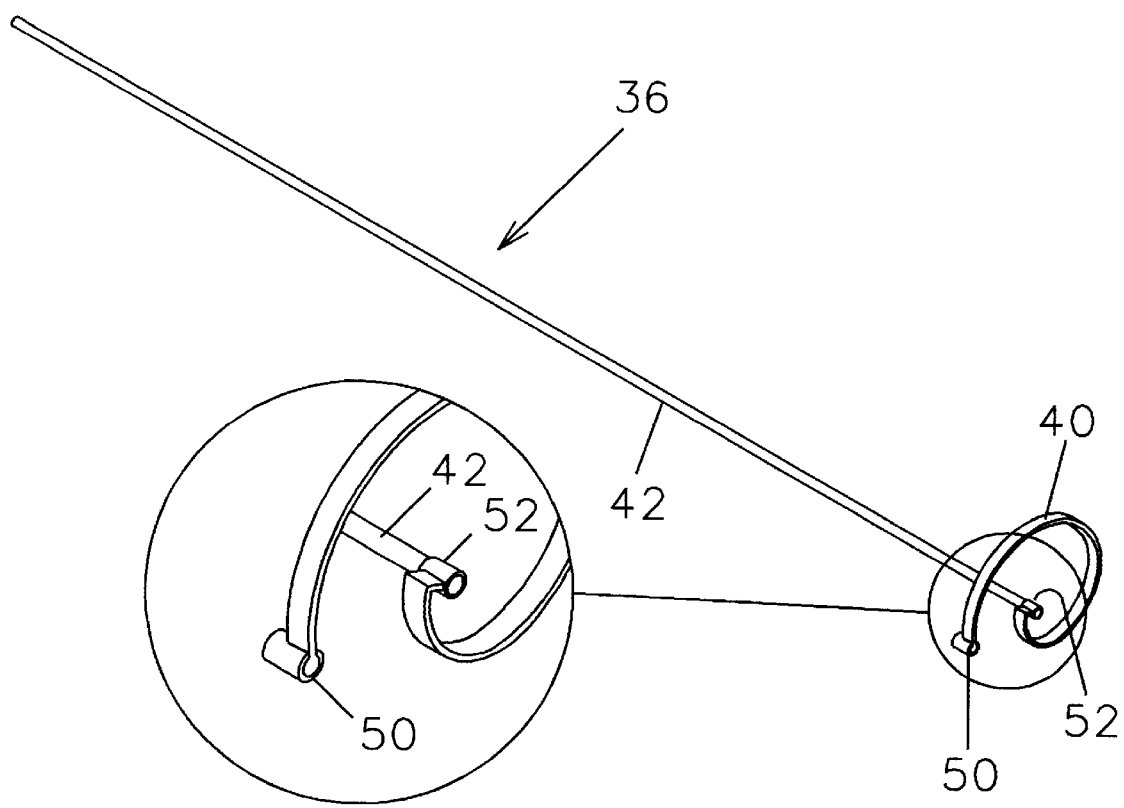
FIG. 5 is a perspective view of the cam bar of the air vent of FIG. 2 as attached to the spring.
Figure 6:
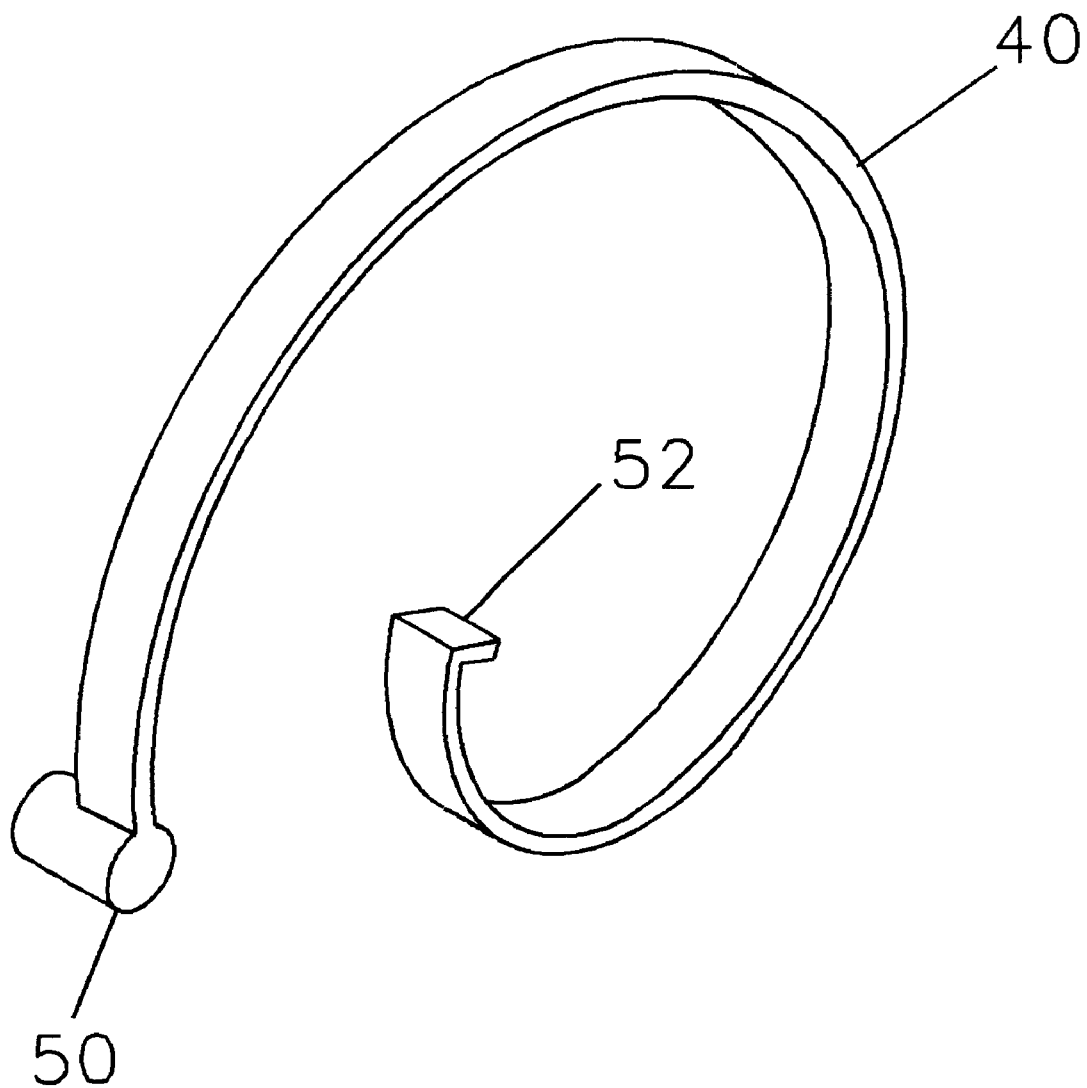
FIG. 6 is a perspective view of the spring of the cam member of FIG. 5 on an enlarged scale.

Louver rest 34 is fixedly and securably mounted within housing 12 at the end opposite cam member 36. Cam member 36 includes spring 40 and cam bar 42. See FIG. 5. Spring 40 is coiled and is preferably formed of two types of metal unitarily and integrally coupled together, each metal chosen so as to respond to changes in the ambient air temperature. Spring 40 is fixedly and securably mounted at its first end 50 to housing 12 and is fixedly and securably mounted at its second end 52 to camming bar 42. See FIGS. 2 and 3. Camming bar 42 rotatably extends between the lower end bars and is mounted to a lower edge of a louver 14 within housing 12. (See FIG. 9).

In operation, louvers 14 open and close depending upon the ambient air temperature. More specifically, when the ambient air temperature is low, spring 40 remains tightly coiled, and louvers 14 remain in their closed position, as in FIGS. 3 and 8. As the temperature increases, spring 40 begins to slowly uncoil at its second end 52 causing cam bar 42 to rotate. As the first end 50 of spring 40 is secured in placed by housing 12, the rotation/pivoting action of cam bar 42 imparts translational movement to the first louver 42 linked thereto and upper end bars 32. This action causes a displacement between the upper and lower end bars 32 (FIG. 10) which in turn causes the downstream louvers 14 to pivot from their closed position to an open position, as in FIGS. 2 and 7. See also FIGS. 10–11. Thus, cam bar 42 must have a diameter large enough to cause upper end bars 32 to slide the distance necessary to pivot louvers 14 between their full open and full closed positions, or about 90°.

Figure 11:
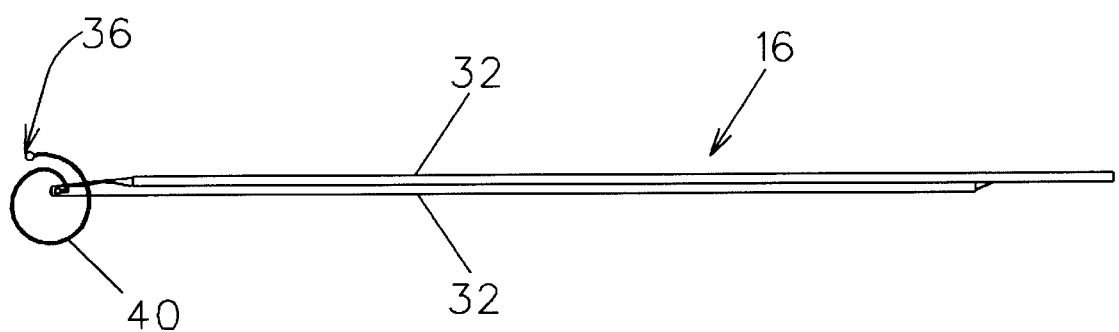
FIG. 11 is a side diagrammatic view of the louvers nounted within the frame in their closed position.

Of course, as the temperature cools, spring 40 begins to coil and retract. As it does so, second end 52 of spring 40 causes cam bar 42 to rotate/pivot in the opposite direction to ultimately place the upper end atop the lower end bars which in turn pivots louvers 14 back to their closed position (FIG. 11). In the closed position, the louver 14 adjacent the end of housing 12 opposite cam member 36 engages and rests on louver rest 34 for support.

It is understood that various metal types can be utilized for spring 40 so as to coil and uncoil according to changes in temperature.

It is to be understood that while a certain form of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. An air vent, comprising:

a housing;

a louver frame mounted to said housing, having a first open and a second closed position;

a series of louvers mounted within said frame and in movement therewith, said louvers being generally parallel at said first frame position and generally overlapping one another at said second frame position; and a cam member responsive to changes in ambient air temperature which imparts rotary motion to said frame and louvers therein to move said louvers between said first open position and said second closed position;

said frame including a pair of upper and lower end bars pivotally mounted to opposite ends of said louvers;

said cam member being pivotally attached to at least one louver, a relative movement of said cam member pivoting said at least one louver and said frame between said first open and second closed positions.

2. An air vent as in claim 1 wherein:

said cam member includes a bar and a spring;

said bar being linked to said at least one louver;

said spring having a first end fixedly mounted to said housing and a second movable end mounted to said bar, so that contraction and expansion of said spring in response to changes in ambient air temperature moves said second spring end and said bar linked thereto in a manner to impart movement to said at least one louver, said louver movement transferred to said upper or lower end bars whereby to move said frame between said first and second positions to open and close said louvers.

3. An air vent as in claim 2 wherein:

said spring is formed of two types of metal, said spring metals contracting and expanding in response to changes in ambient air temperature.

4. An air vent, comprising:

a housing;

a louver frame mounted to said housing;

a series of louvers pivotally mounted within said frame;

a camming member on said housing for pivoting said louvers between an open position and a closed position in response to ambient air temperature changes;

said camming member including a spring fixedly mounted at one end to said housing and a camming bar mounted to said louvers;

said spring formed of a combination of metals which react to changes in the ambient air temperature, said spring expanding as the temperature increases to pivot said bar and said louvers to said open position and contracting as the temperature decreases to pivot said bar and louver to said closed position;

said frame including upper and lower end bars pivotally attached to opposing ends of said louvers;

said camming bar being mounted to one louver to impart a pivoting action thereto, said one louver imparting motion to said end bars to pivot each other louver accordingly, between said open and closed positions.

5. An air vent as claimed in claim 4 wherein said upper end bars are movable and said lower end bars are fixedly mounted to said frame.

* * * * *